(12) United States Patent
Dolphin et al.

(10) Patent No.: US 7,485,323 B2
(45) Date of Patent: *Feb. 3, 2009

(54) PROCESS FOR MAKING A LOW MOLECULAR WEIGHT GELATINE HYDROLYSATE AND GELATINE HYDROLYSATE COMPOSITIONS

(75) Inventors: John M. Dolphin, Sioux City, IA (US); Tom Keenan, Sioux City, IA (US); Jason D. Russell, Sioux City, IA (US); Wilfried Babel, Heidelberg (DE)

(73) Assignee: Gelita AG, Eberbach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/140,863

(22) Filed: May 31, 2005

(65) Prior Publication Data
US 2006/0269987 A1    Nov. 30, 2006

(51) Int. Cl.
*A61K 9/48* (2006.01)
*A61K 51/08* (2006.01)
*A61K 38/01* (2006.01)
*C09H 3/00* (2006.01)
*C09H 3/02* (2006.01)

(52) U.S. Cl. .................. 424/456; 424/1.25; 530/354
(58) Field of Classification Search .............. 424/456, 424/1.25; 530/354
See application file for complete search history.

(56) References Cited

U.S. PATENT DOCUMENTS

| | | | |
|---|---|---|---|
| 3,930,050 A | 12/1975 | Faber | |
| 3,962,384 A | 6/1976 | Cannalonga et al. | |
| 4,176,199 A | 11/1979 | Vollmer et al. | |
| 4,299,847 A | 11/1981 | Morris | |
| 4,355,146 A | 10/1982 | Nakamura et al. | |
| RE33,251 E * | 7/1990 | Wittwer et al. ........... | 156/275.1 |
| 4,992,100 A | 2/1991 | Koepff et al. | |
| 5,227,157 A | 7/1993 | McGinty et al. | |
| 6,207,199 B1 * | 3/2001 | Allen et al. ................. | 424/499 |
| 6,455,067 B1 | 9/2002 | Woo et al. | |
| 6,548,077 B1 | 4/2003 | Gunasekaran | |
| 6,699,319 B2 * | 3/2004 | Adams et al. ............... | 106/476 |
| 2002/0044968 A1 | 4/2002 | van Lengerich | |
| 2002/0164681 A1 | 11/2002 | Lafargue et al. | |
| 2002/0165359 A1 | 11/2002 | Lafargue et al. | |
| 2003/0166149 A1 | 9/2003 | De Bruin et al. | |
| 2003/0224361 A1 | 12/2003 | Qiao et al. | |
| 2004/0175428 A1 | 9/2004 | Appel et al. | |

FOREIGN PATENT DOCUMENTS

| EP | 0 392 006 B1 | 10/1990 |
|---|---|---|
| EP | 0 984 703 B1 | 3/2000 |
| WO | WO 9307762 A1 * | 4/1993 |
| WO | WO 97/43910 | 11/1997 |
| WO | WO 98/51163 | 11/1998 |
| WO | WO 94/25580 | 11/1999 |
| WO | WO 2004/010974 A2 | 2/2004 |

OTHER PUBLICATIONS

Singh et al., "Alteration in dissolution characteristics of gelatin-containing formulations," Pharm Technol pp. 36-56, Apr. 2002, www.pharmtech.com.*
Brenda, record for the enzyme pepsin, EC No. 3.4.23.1, http://www.biobase.de/brenda_ligand/php/result_flat.php4?ecno=3.4.23.1, printed on Mar. 30, 2007.*
Digenis et al., "Cross-linking of gelatin capsules and its relevance to their in vitro-in vivo performance," J Pharm Sci 83(7):915-921, 1994.*
Davis et al., "Kinetic study of the crosslinking of gelatin by formaldehyde and glyoxal," J Polymer Sci 1:799-815, 1963.*
Adesunloye, T.A., et al., "Effect of Glycine/Citric Acid on the Dissolution Stability of Hard Gelatin Capsules". *Drug Dev. Ind. Pharm.*, 1998, 24(6), 493-500.
Adler-Nissen, J., "Determination of the Degree of Hydrolysis of Food Protein Hydrolysates by Trinitrobenzenesulfonic Acid", *J. Agric. Food Chem.*, 1979, 27(6): 1256-62.
Adler-Nissen, J., "Enzymic Hydrolysis of Food Proteins"; Elsvier Applied Science Publishers Ltd. (1976), p. 122.
Albert, K., et al., "Crosslinking of Gelatin with Formaldehyde; a $^{13}C$ NMR Study". *Z. Naturforsch.*, 1986, 41b: 351-358.
Carstensen, J.T., et al., "Pellicle Formation in Gelatin Capsules", *Drug Dev. Ind. Pharm.* (1993) 19(20), 2709-2712.
Church, F.C., et al., "Spectrophotmetric Assay Using o-Phthaldialdehyde for Determination of Proteolysis in Milk and Isolated Milk Proteins", *J. of Dairy Sci.*, 1983, 66: 1219-1227.
Davis, P., et al., "Kinetic Study of the Crosslinking of Gelatin by Formaldehyde and Glyoxal". *J. Polym. Sci. Part A.*, 1963, 1: 799-815.
Digenis, G.A., et al., "Cross-Linking of Gelatin Capsules and its Relevance to Their in Vitro-In Vivo Performance". *J. Pharm. Sci.*, Jul. 1994, 83(7):915-921.
Fraenkel-Conrat, H., et al., "The Reaction of Formaldehyde with Proteins". *J. Am. Chem. Soc.*, Jun. 1945, 67(6):950-954.
Fraenkel-Conrat, H., et al., ."Reaction of Formaldehyde with Proteins. II. Participation of Guanidyl Groups and Evidence of Crosslinking". *J. Am. Chem. Soc.*, Jan. 1946, 68(1): 34-37.
Fraenkel-Conrat, H., et al."The Reaction of Formaldehyde with Proteins V. Cross-linking between Amino and Primary Amide or Guanidyl Groups". *J. Am. Chem. Soc.*, Aug. 1948, 70(8): 2673-2684.
Gold, T.B., et al., "Studies on the Influence of pH and Pancreatin on $^{13}C$-Formaldehyde-Induced Gelatin Cross-Links Using Nuclear Magnetic Resonance". *Pharm. Dev. Tech.*, 1996, 1(1): 21-26.
Gutsaliuk, V.M., et al., "Enzymatic hydrolysis of gelatin", *Ukr Biokhim Zh* (Sep.-Oct. 1991) vol. 63, pp. 39-45 with English Abstract from PubMed.

(Continued)

*Primary Examiner*—Jon P Weber
*Assistant Examiner*—Rosanne Kosson
(74) *Attorney, Agent, or Firm*—Leydig, Voit & Mayer, Ltd.

(57) ABSTRACT

The present invention provides a process to make a gelatine hydrolysate, a gelatine hydrolysate and gelatine compositions comprising gelatine hydrolysates. More specifically, the invention provides gelatine compositions having improved cross-linking and dissolution properties.

13 Claims, 1 Drawing Sheet

OTHER PUBLICATIONS

Ivanov, C., et al., "Synthesis and characterizations of natural polymers hydrogels used in pharmacological applications", *Technical University,,Gh. Asachi of Iasi, Faculty of Industrial Chemistry, Department of Macromolecules, Romania*, Google search of the title.

Kim, S.-K., et al., "Angiotensin I converting enzyme inhibitory peptides purified from bovine skin gelatin hydrolysate", *J Agric Food Chem* (2001) vol. 49, pp. 2992-2997.

Kokil, S.N., et al., "Effect of Molecular Weight of Hydrolyzed Gelatin on its Binding Properties in Tablets: A Technical Note", www.aapspharmscitech.org, Article 41, submitted Mar. 8, 2004; accepted Jun. 8, 2004.

Kozlov, M., et al., "The Structure and Properties of Solid Gelatin and the Principles of Their Modification", *Polymer* (1983) vol. 24, pp. 651-666.

Marks, E.M., et al., "The Phenomenon of Gelatin Insolubility", *Food Tech.* (1968) 22, 1433-1436.

Matsuda, S., et al., "Bioadhesion of Gelatin Films Crosslinked with Glutaraldehyde", *J Biomed Mater. Res.* Apr. 1999; 45(1):20-27.

Metz, B., et al., "Identification of Formaldehyde-induced Modifications in Proteins". *J. Bio. Chem.*, Feb. 2004, 279(8): 6235-6243.

Nagaraj, R.H. et al., "Protein Cross-Linking by the Maillard Reaction". *J. Biol. Chem.*, Aug. 1996, 271(32):19338-19345.

Nielsen, P.M., et al., "Improved Method for Determining Food Protein Degree of Hydrolysis". *J. of Food Sci.*, 2001, 66(5): 642-646.

Ofner III, C.M., et al., "Crosslinking Studies in Gelatin Capsules Treated with Formaldehyde and in Capsules Exposed to Elevated Temperature and Humidity". *J. Pharm. Sci.*, Jan. 2001, 90(1): 79-88.

Okamoto, M., et al., "A termostable collagenolytic protease with a very large molecular mass produced by therrmphillic *Bacillus* sp. strain MO-1" *App Microbiol Biotechnol* (2001) vol. 57, pp. 103-108.

Phillips, A.L., et al., "Bovine placental protease specificity toward muscle connective tissue proteins", *J Anim Sci* (Jul. 2000) vol. 78, pp. 1861-1856.

Ramo Rao, K.V., et al., "A film Approach for the Stabilization of Gelatin Preparations Against Cross-Linking". *Pharmaceutical Technology.* Apr. 2003: 54-63.

Ramo Rao, K.V., et al., "Sensitivity of Gelatin Raw Materials to Cross-Linking—The Influence of Bloom Strength, Type, and Source", *Pharm. Tech.* Dec. 2002 pp. 42-46.

Singh, S., et al., "Alteration Dissolution Characteristics of Gelatine-Containing Formulations. A Review of the Problem, Test Methods, and Solutions", *Pharmaceutical Technology.* Apr. 2002; 36-58.

Ward, A. G., et al., "The Chemical Reactivity of Gelatin", *The Science and Technology of Gelatin.* Academic Press Inc. 1977, pp. 231-233.

\* cited by examiner

PROCESS FOR MAKING A LOW MOLECULAR WEIGHT GELATINE HYDROLYSATE AND GELATINE HYDROLYSATE COMPOSITIONS

FIELD OF THE INVENTION

The present invention generally relates to a gelatine hydrolysate, a process for making the gelatine hydrolysate, and a composition comprising the gelatine hydrolysate. More specifically, the present invention provides a low molecular weight gelatine hydrolysate having a high primary amine content, to a process for making the gelatine hydrolysate, and to a gelatine composition comprising the gelatine.

BACKGROUND OF THE INVENTION

Gelatine is manufactured by the thermal denaturation of collagen contained in materials such as pig skin, cattle skin or hide, and animal bones. Like its parent protein, collagen, gelatine is defined by a distinctive structure comprising a unique blend of amino acids. Native gelatine is a scleroprotein based on a polypeptide chain comprising approximately 1050 amino acids. Three of these polypeptide chains come together to form a triple helix. Superimposition of several of these triple helices produces fibrils of collagen that are stabilized by cross-linking, hence forming a three-dimensional network structure. This particular structure renders collagen insoluble; it is then brought into soluble form by partial hydrolysis as gelatine or gelatine hydrolysate. The amino acid content of collagen and hence of gelatine, is about one third glycine and a further 22% proline and 4-hydroxyproline; the remaining 45% comprise 17 different amino acids. Gelatine has a particularly high content of acidic and basic amino acids. Of the acidic amino acids (glutamic acid and aspartic acid), variable amounts are present in the amido form as glutamine and asparagine depending on the processing conditions used in the gelatine manufacturing process. Cysteine is completely absent; of the sulphur-containing amino acids, methionine is the only one present.

Gelatine can be utilized in a wide array of applications depending upon its starting material and method of manufacture. This is because the physical and chemical behavior of gelatine is determined on one hand by a combination of its amino acid content and the resulting spatial structure, and on another hand by a myriad of conditions such as pH, ionic strength and reactions with other molecules. For example, different kinds of gelatines are utilized in diverse applications such as food, photographic, cosmetic, and pharmaceutical.

In the pharmaceutical industry, gelatine is used in the manufacture of hard and soft capsules. Gelatine capsules provide a convenient and efficient method to orally administer a drug because the capsules disintegrate rapidly upon exposure to the acidic content of the stomach, thus releasing the drug into the body. While gelatine capsules provide a pharmaceutically elegant manner in which to administer a drug, there is, however, a risk that the gelatine capsule may suffer from retardation of disintegration and dissolution resulting from a process known as cross-linking. Cross-linking is believed to occur when carbonyl compounds in gelatine, carbonyl-containing fill ingredients in capsules, or decomposition of fill ingredients into carbonyl compounds, react with primary amines and other nitrogenous compounds present in gelatine to form cross-links. Cross-linking, in particular, can have dire consequences on the performance of gelatine capsules upon extended storage and exposure to extremes of heat and humidity. Extensive gelatine cross-linking in capsule formulations may lead to the formation of a pellicle. The pellicle acts as thin, rubbery, water-insoluble layer that can restrict, or prevent the contents of the capsule from expelling.

One widely reported means to prevent cross-linking in gelatine capsules focuses on products that act as carbonyl scavengers, preventing the interaction of aldehyde with the gelatine capsule shell, thus preventing gelatine cross-linking. These methods all generally suggest adding products to the gelatine composition. For example, it has been shown that adding the amino acid glycine and citric acid to gelatine hard capsule formulations improved the dissolution profile of the hard capsule in the presence of certain fill materials (3). But the addition of carbonyl scavengers such as glycine, and carboxylic acids such as citrate, in the amounts needed to reduce cross-linking in gelatine capsules is significantly cost prohibitive. As such, adding these products to gelatine is not a practical solution to reduce cross-linking in gelatine capsules.

SUMMARY OF THE INVENTION

The present invention provides a practical, cost-effective means to reduce cross-linking in gelatine. Briefly, the invention encompasses a low molecular weight gelatine hydrolysate that, when blended with high molecular weight gelatine, improves the gelatine's cross-linking and dissolution properties by increasing the amounts of free glycine, other amino acids, and small peptides in the blended gelatine product. Advantageously, because the gelatine hydrolysate and blended gelatine composition of the invention have improved cross-linking properties achieved without the addition of products such as glycine, the gelatine may still be marketed as a natural product.

Among the several aspects of the invention, therefore, is a process for producing a gelatine hydrolysate having an average molecular weight between about 100 and about 1500 Da and an average primary amine content from about $1.0 \times 10^{-3}$ to about $1.0 \times 10^{-2}$ µMol of primary amine per µg of gelatine hydrolysate. The process comprises contacting a gelatine starting material with at least one proteolytic enzyme having endopeptidase activity to form an endopeptidase digested gelatine product. The endopeptidase digested gelatine product is then typically contacted with at least one proteolytic enzyme having exopeptidase activity. Generally, the endopeptidase and exopeptidase proteolytic digestions proceed for a sufficient length of time and are conducted under reaction conditions so as to form the gelatine hydrolysate.

Another aspect of the invention encompasses a process for making a gelatine hydrolysate. The process comprises contacting a gelatine starting material with a series of at least three proteolytic enzymes having endopeptidase activity to form an endopeptidase digested gelatine product. Typically, the three proteolytic enzymes consist of Corolase® 7089, Enzeco® Bromelain Concentrate, and Papain 6000L. The endopeptidase digested gelatine product is then contacted with a series of at least two proteolytic enzymes having exopeptidase activity. Generally, the two proteolytic enzymes consist of Validase® FPII and Corolase® LAP.

Yet a further aspect of the invention provides a gelatine hydrolysate. The gelatine hydrolysate will typically have an average molecular weight between about 100 and about 1500 Da and an average primary amine content from about $1.0 \times 10^{-3}$ to about $1.0 \times 10^{-2}$ µMol of primary amine per µg of gelatine hydrolysate. In one embodiment, the gelatine hydrolysate is made by a process comprising contacting a gelatine starting material with a series of at least three proteolytic enzymes having endopeptidase activity to form an endopeptidase digested gelatine product. Typically, the three proteolytic enzymes consist of Corolase® 7089, Enzeco® Bromelain Concentrate, and Papain 6000L. The endopeptidase digested gelatine product is then contacted with a series of at least two proteolytic enzymes having exopeptidase activity. Generally, the two proteolytic enzymes consist of Validase® FPII and Corolase® LAP.

An additional aspect of the invention is directed to a gelatine composition. The composition comprises a gelatine hydrolysate and gelatine. Typically, the composition will comprise from about 1% to about 20% by weight of the gelatine hydrolysate and from about 80% to about 99% by weight of the gelatine.

Other objects and features of the invention will be in part apparent and in part pointed out hereinafter.

DESCRIPTION OF THE PREFERRED EMBODIMENTS

Figure 1:
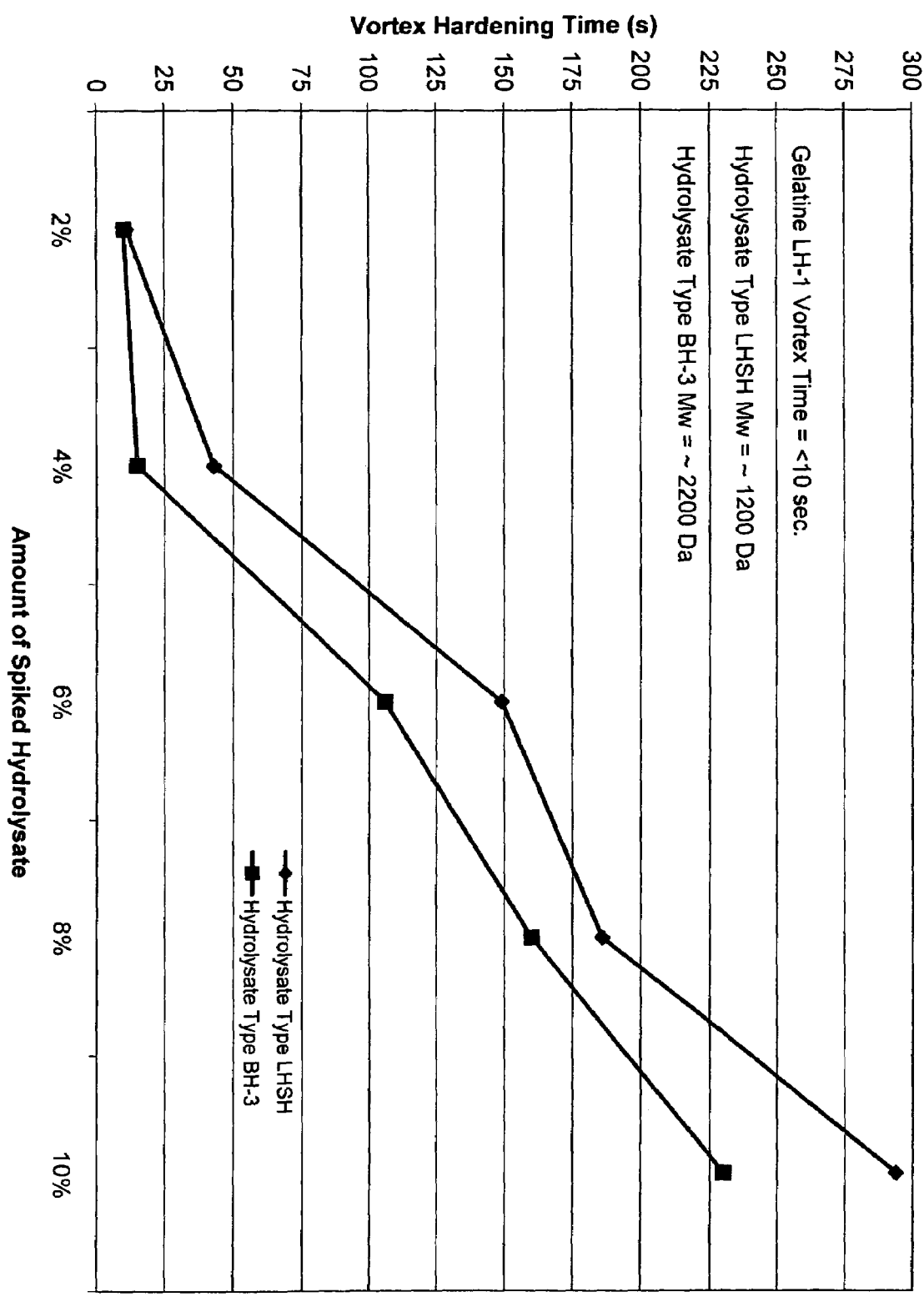
FIG. 1 shows the reduction in formaldehyde induced cross-linking of LH-1, a limed-hide gelatine, upon the addition of 2 different gelatine hydrolysates, Type BH-3 and Type LHSH, as measured by the Vortex Hardening procedure. Hydrolysate Type BH-3 is a low molecular weight limed-hide hydrolysate and Type LHSH is a limed-hide hydrolysate of the present invention.

The present invention provides a novel gelatine hydrolysate, a process to make the gelatine hydrolysate and gelatine compositions comprising the gelatine hydrolysate. It has been discovered that blending a low molecular weight gelatine hydrolysate and in particular, the gelatine hydrolysate of the invention, with gelatine, improves the gelatine's cross-linking and dissolution properties by increasing the amounts of free glycine, other amino acids, and small peptides in the blended gelatine product. Advantageously, the present invention provides a cost effective means to reduce gelatine cross-linking with the benefit of maintaining the original amino acid composition of gelatine. As such, the gelatine hydrolysate compositions of the present invention can still be marketed as natural products.

I. Process for Making the Gelatine Hydrolysate

One aspect of the present invention encompasses a process to produce a gelatine hydrolysate having an average molecular weight between about 100 and about 1500 Da and an average primary, amine content from about $1.0 \times 10^{-3}$ to about $1.0 \times 10^{-2}$ µMol of primary amine per µg of gelatine hydrolysate. The process comprises contacting a gelatine starting material with at least one proteolytic enzyme having endopeptidase activity to form an endopeptidase digested gelatine product. The endopeptidase digested gelatine product is then typically contacted with at least one proteolytic enzyme having exopeptidase activity. Generally, the endopeptidase and exopeptidase proteolytic digestions proceed for a sufficient length of time and are conducted under reaction conditions so as to form the gelatine hydrolysate.

The gelatine starting material used in the process of the invention is typically derived from collagen or collagen rich tissue available from several suitable raw materials. Collagen rich tissues include the skin and bones from animals, such as from pigs or cattle. There are generally two main types of gelatine derived from collagen, Type A and Type B that differ in their method of manufacture. In one embodiment, the gelatine starting material is Type A gelatine. Type A, with an isoionic point of 7 to 10.0, is derived from collagen with exclusively acid pretreatment by methods generally known in the art. In an alternative embodiment, the gelatine starting material is Type B gelatine. Type B, with an isoionic point of 4.8 to 5.8, is the result of an alkaline pretreatment of collagen and is produced by methods generally known in the art. In another alternative embodiment, the gelatine starting material is a mixture of Type A and Type B. Irrespective of the embodiment, the gelatine starting material will normally contain from about 80% to about 90% by weight protein, from about 0.1% to about 2% by weight mineral salts and from about 10% to 15% by weight water.

It also contemplated that the physical properties of the gelatine starting material can and will vary depending upon the intended use of the gelatine hydrolysate. The gelatine starting material will typically have an average molecular weight of from about 50,000 Da to about 200,000 Da. In a particularly preferred embodiment, the gelatine starting material will have an average molecular weight of less than about 150,000 Da. In one embodiment, the bloom strength of the gelatine starting material will be from about 50 to about 300, the pH will be from about 3.8 to about 7.5, the isoelectric point will be from about 4.7 to about 9.0, the viscosity will be from about 15 to about 75 mP and the ash will be from about 0.1 to about 2.0%. In an alternative embodiment when the gelatine starting material is substantially Type A gelatine, the bloom strength will be from about 50 to about 300, the pH will be from about 3.8 to about 5.5, the isoelectric point will be from about 7.0 to about 9.0, the viscosity will be from about 15 to about 75 mP and the ash will be from about 0.1 to about 2.0%. In an alternative embodiment when the gelatine starting material is substantially Type B gelatine, the bloom strength will be from about 50 to about 300, the pH will be from about 5.0 to about 7.5, the isoelectric point will be from about 4.7 to about 5.4, the viscosity will be from about 20 to about 75 mP and the ash will be from about 0.5 to about 2.0%. In one preferred embodiment where the gelatine hydrolysate is used in the manufacture of hard capsule pharmaceutical products, the gelatine starting material will have a bloom strength from about 200 to about 300, a viscosity from about 40 to about 60 mP and a pH from about 4.5 to about 6.5. In yet another preferred embodiment where the gelatine hydrolysate is used in the manufacture of soft shell capsule pharmaceutical products, the gelatine starting material will have a bloom strength from about 125 to about 200, a viscosity from about 25 to about 45 mP and a pH from about 4.5 to about 6.5.

In the process of the invention, the gelatine starting material is typically mixed or dissolved in water by a process known as swelling to form a solution comprising from about 10% to about 60% gelatine by weight. In one embodiment, the solution has from about 10% to about 15% gelatine by weight. In another embodiment, the solution has from about 15% to about 20% gelatine by weight. In still another embodiment, the solution has from about 25% to about 30% gelatine by weight. In a further embodiment, the solution has from about 30% to about 35% gelatine by weight. In still another embodiment, the solution has from about 35% to about 40% gelatine by weight. In an additional embodiment, the solution has from about 40% to about 45% gelatine by weight. In a further embodiment, the solution has from about 45% to about 50% gelatine by weight. In yet another embodiment, the solution has from about 50% to about 55% gelatine by weight. In still another embodiment, the solution has from about 55% to about 60% gelatine by weight.

It is contemplated that gelatines having varying particle sizes may be utilized in the invention. For example, the gelatine particle size may vary from about 0.1 mm to about 9.525 mm. In one embodiment, the gelatine particle size may be fine having an average particle size from about 0.1 to about 0.3 mm. In another embodiment, the gelatine particle size may be medium having an average particle size of from about 0.3 to about 0.8 mm. In still another embodiment, the gelatine particle size may be large having an average particle size of approximately greater than about 0.8 mm. Generally speaking, the particle size of the gelatine will impact the amount of time needed for the gelatine to dissolve in solution. During the swelling process, the ability for gelatine to absorb up to ten times its weight in cold water is utilized. Gelatines having a fine particle size swell within a few minutes, gelatines having a medium particle size swell within about 8 to about 12 minutes, and gelatines having a large particle size swell within about an hour. Typically, low concentrated gelatine solutions, solutions having for example, from about 10% to about 20% by weight gelatine, can be prepared using all particle sizes. For highly concentrated solutions, solutions having for example, from about 30% to about 34% gelatine by weight, coarse particles are typically used because they tend not to aggregate and produce fewer air bubbles when being processed.

After the gelatine has dissolved in solution through the swelling process and typically prior to the addition of the proteolytic enzymes, the pH, temperature and Redox State of the solution is typically adjusted so as to optimize the hydrolysis reaction, and in particular, to ensure that the cysteine-containing proteolytic enzymes utilized in the hydrolysis reaction function near their optimum activity level. The pH of the gelatine solution is adjusted and maintained at from about 5 to about 7. In a particularly preferred embodiment, the pH of the gelatine solution is adjusted and maintained at from about 6.0 to about 6.5. At this pH, proteolytic enzymes detailed below are near their optimum activity level. The pH of the gelatine solution may be adjusted and monitored according to methods generally known in the art. For example, to decrease the pH of the gelatine solution an acid, such as hydrochloric acid, is typically added. Alternatively, to increase the pH of the gelatine solution a base, such as sodium hydroxide, is typically added. The temperature of the gelatine solution is preferably adjusted and maintained from about 40° C. to about 65° C. during the hydrolysis reaction in accordance with methods known in the art. In a particularly preferred embodiment, the temperature of the gelatine solution is adjusted and maintained from about 50° C. to about 60° C. during the hydrolysis reaction. In general, temperatures above this range may deactivate proteolytic enzymes, while temperatures below this range tend to slow the activity of the proteolytic enzymes. Depending upon the proteolytic enzyme used in the hydrolysis reaction, the Redox State of the gelatine solution typically should be adjusted and maintained as neutral to slightly on the reducing side. High levels of oxidants tend to inactivate some of the cysteine-containing proteolytic enzymes used in the hydrolysis reaction, while low levels of reductants may serve to keep some of the proteolytic enzymes, such as papain, active until the deactivation step.

In general, the hydrolysis reaction is conducted by adding proteolytic enzymes to the gelatine solution. Several proteolytic enzymes are suitable for use in the process of the invention. In a preferred embodiment, the proteolytic enzymes will be food grade enzymes having endopeptidase or exopeptidase activity at a pH from about 5 to about 7 and at a temperature from about 40° C. to about 65° C. In a particularly preferred embodiment, the proteolytic enzymes will be food grade enzymes having endopeptidase or exopeptidase activity at a pH from about 6 to about 6.5 and at a temperature from about 50° C. to about 60° C.

In one embodiment, the endopeptidase will be a food grade serine proteinase belonging to EC 3.4.21. In one alternative of this embodiment, the serine proteinase is a chymotrypsin proteinase. In a further alternative of this embodiment, the serine proteinase is a subtilisin proteinase. In another embodiment, the endopeptidase will be a food grade cysteine proteinase belonging to EC 3.4.22. In yet another embodiment, the endopeptidase will be a food grade aspartic proteinase belonging to EC 3.4.23. In an additional embodiment, the endopeptidase will be a food grade metalloproteinase belonging to EC 3.4.24. Exemplary non-limiting examples of food grade endopeptidases that may be utilized in the process of the invention include Validase® AFP, Validase® FP 500, Alkaline Protease Concentrate, Validase® TSP, Enzeco® Bromelain Concentrate, Corolase® 7089, Papain 600L and Validase® Papain Concentrate Sulfite Free.

In a further embodiment, the exopeptidase will be a food grade amino peptidase belonging to EC 3.4.11. In another embodiment, the exopeptidase will be a food grade dipeptidase belonging to EC 3.4.13. In still another embodiment, the exopeptidase will be a food grade di, tripeptidylpeptidase belonging to EC 3.4.14. In yet another embodiment, the exopeptidase will be a food grade peptidyldipeptidase belonging to EC 3.4.15. In an additional embodiment, the exopeptidase will be a food grade serine-type carboxy peptidase belonging to EC 3.4.16. In yet another embodiment, the exopeptidase will be a food grade metallo carboxy peptidase belonging to EC 3.4.17. In an additional embodiment, the exopeptidase will be a food grade cysteine-type carboxy peptidase belonging to EC 3.4.18. In still an another embodiment, the exopeptidase will be a food grade omega peptidase belonging to EC 3.4.19. An exemplary example of a food grade exopeptidase that may be utilized in the process of the invention includes Validase® FP II or Corolase LAP®.

Another example of a food grade hydrolytic enzyme that may be used in the process of the invention is Validase® FP Concentrate. Examples of other suitable proteolytic food grade enzymes are shown in Table A.

TABLE A

| Proteolytic Enzyme | Source |
| --- | --- |
| Alcalase ® | Novoenzymes |
| Flavourzyme ® | Novoenzymes |
| Protamex ® | Novoenzymes |
| Fungal Protease Concentrate | Genencor Enzymes |
| Fungal Protease 500,000 | Genencor Enzymes |
| Protex ™ 6L | Genencor Enzymes |
| Multifect ® P-3000 | Genencor Enzymes |
| Multifect ® Neutral | Genencor Enzymes |
| Corolase ® TS | AB Enzymes |
| Corolase ® PP | AB Enzymes |
| Enzeco ® Chymotrypsin 1:1 | Enzeco Development Corp. |
| Enzeco ® Trypsin 1200 | Enzeco Development Corp. |
| Enzeco ® Trypsin 6 | Enzeco Development Corp. |
| Enzeco ® Ficin | Enzeco Development Corp. |
| Enzeco ® Fungal Acid Protease | Enzeco Development Corp. |
| Enzeco ® Fungal Protease 100 | Enzeco Development Corp. |
| Enzeco ® Fungal Protease 180 | Enzeco Development Corp. |
| Enzeco ® Fungal Protease 400 | Enzeco Development Corp. |
| Enzeco ® Exo-Protease | Enzeco Development Corp. |
| Enzeco ® Neutral Bacterial Protease 2X | Enzeco Development Corp. |
| Enzeco ® Neutral Bacterial Protease 160K | Enzeco Development Corp. |
| Enzeco ® Glutaminase ADK | Enzeco Development Corp. |
| Enzeco ® Alkaline Protease L-600 FG | Enzeco Development Corp. |
| Enzeco ® Alkaline Protease 44MG | Enzeco Development Corp. |
| Enzeco ® Alkaline Protease 66L | Enzeco Development Corp. |
| HT-Proteolytic | Deerland Enzymes |
| BC Pepsin 3000_ P389P-3 | Biocatalysts |

TABLE A-continued

| Proteolytic Enzyme | Source |
| --- | --- |
| BC Pepsin 10000_ P389P-10 | Biocatalysts |
| Promod ™ 144MG | Biocatalysts |
| Promod ™ 144L | Biocatalysts |
| Promod ™ 144P | Biocatalysts |
| Promod ™ 192P | Biocatalysts |
| Promod ™ 194P | Biocatalysts |
| Promod ™ 278P | Biocatalysts |
| Promod ™ 279P | Biocatalysts |
| Promod ™ 298L | Biocatalysts |
| Promod ™ 439L | Biocatalysts |
| Promod ™ 648L | Biocatalysts |
| Promod ™ 671L | Biocatalysts |

Typically, combinations of endopeptidases and exopeptidases will catalyze the hydrolysis reaction. The proteolytic enzymes are preferably selected by considering the protease activity of the enzymes and selecting enzymes that will maximize the cleaving of peptide bonds in the gelatine starting material. In a preferred embodiment, enzymes with preferential endopeptidase activity are added to the gelatine solution first to form an endopeptidase digested gelatine product. The endopeptidase digested gelatine product is then contacted with enzymes having preferential exopeptidase activity. It is also contemplated that in certain embodiments enzymes having exopeptidase activity may be added before or at the same time as enzymes having endopeptidase activity.

In one preferred embodiment, the endopeptidase is selected from the group consisting of Corolase® 7089, Validase® AFP, Validase® FP 500, Alkaline Protease Concentrate, Validase® TSP, Enzeco® Bromelain Concentrate, Papain 6000L and Validase® Papain Concentrate Sulfite Free; and the exopeptidase is Validase® FP II or Corolase® LAP. In yet another embodiment, the endopeptidase is selected from the group consisting of Corolase® 7089, Enzeco® Bromelain Concentrate, and Papain 6000L; and the exopeptidase is selected from the group consisting of Validase® FPII and Corolase® LAP. In a preferred embodiment, each proteolytic enzyme is sequentially added to the gelatine starting material in the following order: Corolase® 7089, Enzeco® Bromelain Concentrate, Papain 6000L, Validase® FPII and Corolase® LAP. In one alternative of this embodiment, each proteolytic enzyme digests the gelatine starting material for approximately 0.5 to about 2 hours before addition of the subsequent proteolytic enzyme.

The amount of proteolytic enzyme added to the hydrolysis reaction can and will vary depending upon the desired degree of gelatine hydrolysis and the duration of the hydrolysis reaction. In general, about 0.025% to about 0.15% (v/w) or (w/w) of the proteolytic enzyme having endopeptidase activity is added and from about 0.025% to about 0.15% (v/w) or (w/w) of the proteolytic enzyme having exopeptidase activity is added for a hydrolysis reaction lasting for a duration of from about 5 hours to about 24 hours. In a preferred embodiment, about 0.05% to about 0.15% (v/w) of Corolase® 7089, about 0.025% to about 0.075% (w/w) of Enzeco® Bromelain Concentrate, about 0.05% to about 0.15% (v/w) of Papain 6000L, about 0.025% to about 0.075% (w/w) of Validase® FPII, and about 0.05% to about 0.15% (v/w) of Corolase® LAP are added to the gelatine starting material.

The hydrolysis reaction will typically proceed for up to approximately 24 hours. Typically, after about 24 hours the quality of the gelatine hydrolysate, in terms of color and smell, will begin to noticeably diminish. In another embodiment, the hydrolysis reaction will proceed from about 1 hour to about 24 hours. In yet another embodiment, the hydrolysis reaction will proceed from about 3 hours to about 15 hours. In still another embodiment, the hydrolysis reaction will proceed from about 5 hours to about 12 hours. To end the hydrolysis reaction, the hydrolyzed gelatine solution may be heated to approximately 90° C. to deactivate the proteolytic enzymes. An additional step to deactivate the cysteine proteases may be required. If so required, the addition of hydrogen peroxide or other oxidizing agent may be added, generally not to exceed 1000 ppm. The gelatine hydrolysate may then be purified from the hydrolysis solution by any means generally known in the art.

Typically, the degree of hydrolysis (DH) of the starting gelatine material in the process of the invention is greater than about 13%. In certain embodiments, the DH is from about 10% to about 20%. In other embodiments, the DH is from about 20% to about 30%. In another embodiment, the DH is from about 30% to about 40%. In yet another embodiment, the DH is from about 40% to about 50%. In still another embodiment, the DH is from about 50% to about 60%. In an additional embodiment, the DH is from about 60% to about 70%. In yet a further embodiment, the DH is from about 70% to about 80%. In still another embodiment, the DH is from about 80% to about 90%. In still another embodiment, the DH is greater than about 90%. The DH is the percentage of the total number of peptide bonds in the gelatine starting material that have been hydrolyzed by proteolytic enzymes. The DH may be calculated by methods generally known in the art, such as according to the Adler-Nissen method (19).

II. Gelatine Hydrolysate

Yet another aspect of the invention encompasses a gelatine hydrolysate made by the process of the invention. Generally speaking, the gelatine hydrolysate, compared to the gelatine starting material, will comprise a mixture of peptide lengths having an increase in the amounts of free glycine, other amino acids, and small peptides. The gelatine hydrolysate will also have a lower average molecular weight and higher primary amine content compared to the gelatine starting material.

The gelatine hydrolysate will typically have an average molecular weight of at least about 100 Da. In other embodiments, the gelatine hydrolysate will typically have an average molecular weight not exceeding about 2000 Da. In some embodiments, the gelatine hydrolysate will have an average molecular weight of from about 100 Da to about 2,000 Da. In other embodiments, the gelatine hydrolysate will have an average molecular weight of about 700 Da to about 1800 Da. In another embodiment, the gelatine hydrolysate will have an average molecular weight of about 700 Da to about 1500 Da. In still other embodiments, the gelatine hydrolysate will have an average molecular weight of from about 800 Da to about 1200 Da. The average molecular weight is the weight of a gelatine hydrolysate as measured by electro-spray ionization liquid chromatography mass spectrometry (ESI-LC/MS). The gelatine hydrolysate may have an average molecular weight of approximately 1200 Da with a molecular weight range from about 75 Da to 8000 Da.

In general, the gelatine hydrolysate will have an average primary amine content of not less than about $1.0 \times 10^{-3}$ µMol of primary amine per µg of gelatine hydrolysate. In another embodiment, the gelatine hydrolysate will have an average primary amine content of not less than about $1.5 \times 10^{-3}$ µMol of primary amine per µg of gelatine hydrolysate. In still another embodiment, the gelatine hydrolysate will have an average primary amine content of not less than about $2.0 \times 10^{-3}$ µMol of primary amine per µg of gelatine hydrolysate. In an additional embodiment, the gelatine hydrolysate will have an average primary amine content of from about from about $1.0 \times 10^{-3}$ to about $1.0 \times 10^{-2}$ µMol of primary amine per µg of gelatine hydrolysate. The primary amine content of the gelatine hydrolysate is measured through derivatization and subsequent UV absorption (6-8) as illustrated in the Examples.

The polypeptides comprising the gelatine hydrolysate are typically from about 1 to about 75 amino acids in length. In one embodiment, the average polypeptide comprising the gelatine hydrolysate is from about 6 to about 18 amino acids in length. In another embodiment, the average polypeptide comprising the gelatine hydrolysate is from about 9 to about 20 amino acids in length. The length of a polypeptide chain may be determined indirectly by size-exclusion chromatography/high performance liquid chromatography (SEC/HPLC).

In one embodiment, the gelatine hydrolysate will have an average molecular weight from about 100 Da to about 2,000 Da, an average primary amine content from about $1.0 \times 10^{-3}$ to about $1.0 \times 10^{-2}$ µMol of primary amine per µg of gelatine hydrolysate, and an average polypeptide length of from about 1 to about 20 amino acids. In still another embodiment, the gelatine hydrolysate will have an average molecular weight from about 700 Da to about 1500 Da, an average primary amine content from about $1.0 \times 10^{-3}$ to about $2.0 \times 10^{-3}$ µMol of primary amine per µg of gelatine hydrolysate, and an average polypeptide length of from about 1 to about 18 amino acids. In another embodiment, the gelatine hydrolysate will have an average molecular weight from about 800 Da to about 1200 Da, an average primary amine content from about $1.0 \times 10^{-3}$ to about $2.0 \times 10^{-3}$ µMol of primary amine per µg of gelatine hydrolysate, and an average polypeptide length of from about 4 to about 18 amino acids.

III. Gelatine Compositions

Another aspect of the invention encompasses a gelatine composition comprising a low molecular weight gelatine hydrolysate and gelatine. Surprisingly it has been found that when a low molecular weight gelatine hydrolysate is blended with high molecular weight gelatine, it improves the gelatine's cross-linking and dissolution properties by increasing the amounts of free glycine, other amino acids, and small peptides in the blended gelatine product, as shown in the Examples.

A number of different gelatine hydrolysates are suitable for use in the gelatine composition. In one embodiment, the gelatine hydrolysate will be an enzymatically-digested hydrolysate. By way of non-limiting example, the gelatine hydrolysate of the present invention is produce via an enzymatic hydrolysis procedure, as detailed above. In another embodiment, the gelatine hydrolysate will be an acid digested hydrolysate. For example, acid hydrolysis may be conducted by digesting a gelatine starting material with approximately 6 N hydrochloric acid for about 24 hours at a reaction temperature of approximately 110° C. In yet another embodiment, the gelatine hydrolysate will be a base digested hydrolysate. By way of non-limiting example, base hydrolysis may be conducted by digesting a gelatine starting material with a strong base, such as sodium hydroxide. Acid and base hydrolysis will typically result in a hydrolysate having free amino acids. In each embodiment (i.e., enzymatic, acid and base hydrolysis), suitable gelatine starting materials are detailed in section I above, which delineates structural and functional properties for gelatine starting materials to be used in the process of the invention.

Typically, gelatine hydrolysates will have a low molecular weight. The average molecular weight may range from about 100 Da to about 5000 Da. In one embodiment, the average molecular weight will be from about 1000 Da to about 4000 Da. In still another embodiment, the average molecular weight will be from about 400 Da to about 2000 Da. In another embodiment, the gelatine hydrolysate will have an average molecular weight from about 700 Da to about 1500 Da. In addition, the gelatine hydrolysate will also have an average primary amine content ranging from about $1.0 \times 10^{-3}$ to about $1.0 \times 10^{-2}$ µMol of primary amine per µg of gelatine hydrolysate. In another embodiment, the average primary amine content may range from about $1.0 \times 10^{-3}$ to about $2.0 \times 10^{-3}$ µMol of primary amine per µg of gelatine hydrolysate. In still another embodiment, the average primary amine content may range from about $2.0 \times 10^{-3}$ to about $4.0 \times 10^{-3}$ µMol of primary amine per µg of gelatine hydrolysate. In still a further embodiment, the average primary amine content may range from about $4.0 \times 10^{-3}$ to about $6.0 \times 10^{-3}$ µMol of primary amine per µg of gelatine hydrolysate. In yet an additional embodiment, the average primary amine content may range from about $6.0 \times 10^{-3}$ to about $1.0 \times 10^{-2}$ µMol of primary amine per µg of gelatine hydrolysate. The gelatine hydrolysate will also generally have an average polypeptide chain length from about 4 to about 50 amino acids. In one embodiment, the average polypeptide comprising the gelatine hydrolysate is from about 1 to about 30 amino acids in length. In another embodiment, the average polypeptide comprising the gelatine hydrolysate is from about 9 to about 20 amino acids in length. The average molecular weight, average primary amine content and average polypeptide chain length are determined as detailed in section II.

In a preferred embodiment, the gelatine hydrolysate used in the composition will be the hydrolysate of the present invention as detailed in section II. Examples of other exemplary gelatine hydrolysates that may be used in the composition are delineated in Table B.

Table B

| GELITA Gelatine Hydrolysates | GELITA Location Where Manufactured | Raw Material | Molecular Weight | Viscosity |
|---|---|---|---|---|
| Type A-1 | Europe/USA | porcine skin | 5.0-9.0 kDa | 20-30 mP (10% @ 30° C.) |
| Type A-2 | Europe | porcine skin | 2.5-4.5 kDa | 30-60 mP (25% @ 20° C.) |
| Type A-3 | Chicago | porcine skin | 2.5-3.0 kDa | 40-60 mP (25% @ 25° C.) |
| Type BH-1 | Europe | bovine hide | 2.0-4.0 kDa | 32-47 mP (20% @ 25° C.) |
| Type BH-2 | Europe | bovine hide | 2.0-4.0 kDa | 32-47 mP (20% @ 25° C.) |
| Type A-4 | Europe/USA | porcine skin | 10.0-18.0 kDa | 25-45 mP (10% @ 30° C.) |
| Type A-5 | Sioux City | porcine skin | 2.0-4.0 kDa | 42-71 mP (20% @ 25° C.) |
| Type BB-1 | Sioux City | bovine bone | 2.0-4.0 kDa | 42-90 mP (20% @ 25° C.) |
| Type BB-2 | Sioux City | bovine bone | 2.0-4.0 kDa | 20-40 mP (20% @ 25° C.) |
| Type BBH-1 | Europe | bovine bone/hide | 2.0-4.0 kDa | 32-50 mP (20% @ 25° C.) |
| Type BB-3 | Chicago | bovine bone | 2.0-4.0 kDa | 30-50 mP (20% @ 25° C.) |

Table B-continued

| GELITA Gelatine Hydrolysates | GELITA Location Where Manufactured | Raw Material | Molecular Weight | Viscosity |
|---|---|---|---|---|
| Type BB-4 | Chicago | bovine bone | 2.0-4.0 kDa | 30-50 mP (20% @ 25° C.) |
| Type BB-5 | Chicago | bovine bone | 2.0-4.0 kDa | 42-90 mP (20% @ 25° C.) |
| Type BB-6 | Chicago | bovine bone | 2.0-4.0 kDa | 42-90 mP (20% @ 25° C.) |
| Type A-6 | Chicago | porcine skin | 2.0-4.0 kDa | 30-60 mP (20% @ 25° C.) |
| Type A-7 | Chicago | porcine skin | 2.0-4.0 kDa | 30-60 mP (20% @ 25° C.) |
| Type A-8 | South America | porcine skin | 2.0-4.0 kDa | 30-60 mP (20% @ 25° C.) |
| Type BH-3 | South America | bovine hide | 2.0-4.0 kDa | 30-60 mP (20% @ 25° C.) |

The gelatine hydrolysate may be blended with several types of gelatine having a broad range of physical and functional properties. The choice of a particular gelatine can and will vary greatly depending upon the intended use of the gelatine composition. Generally speaking, irrespective of the embodiment or intended use, the gelatine is typically derived from collagen or collagen rich tissue available from several suitable raw materials such as from the skin and bones of animals. In one embodiment, the gelatine is Type A gelatine. In another embodiment, the gelatine is Type B gelatine. In still another embodiment, the gelatine is a mixture of Type A and Type B gelatine. The gelatine, irrespective of the embodiment, will preferably contain from about 80% to about 90% by weight protein, from about 0.1% to about 2% by weight mineral salts and from about 10% to 15% by weight water.

The gelatine will typically have a high average molecular weight. In one embodiment, the gelatine will have an average molecular weight of greater than about 200,000 Da. In another embodiment, the gelatine will have an average molecular weight greater than about 150,000 Da. In still another embodiment, the gelatine will have an average molecular weight from about 100,000 Da to about 200,000 Da.

In one embodiment, the bloom strength of the gelatine will be from about 50 to about 300, the pH will be from about 3.8 to about 7.5, the isoelectric point will be from about 4.7 to about 9.0, the viscosity will be from about 15 to about 75 mP and the ash will be from about 0.1 to about 2.0%. In an alternative embodiment when the gelatine is substantially Type A gelatine, the bloom strength will be from about 50 to about 300, the pH will be from about 3.8 to about 5.5, the isoelectric point will be from about 7.0 to about 10.0, the viscosity will be from about 15 to about 75 mP and the ash will be from about 0.1 to about 2.0%. In an alternative embodiment when the gelatine is substantially Type B gelatine, the bloom strength will be from about 50 to about 300, the pH will be from about 5.0 to about 7.5, the isoelectric point will be from about 4.8 to about 5.8, the viscosity will be from about 20 to about 75 mP and the ash will be from about 0.5 to about 2.0%. In one preferred embodiment where the gelatine composition is used in the manufacture of hard capsule pharmaceutical products, the gelatine will have a bloom strength from about 200 to about 300, a viscosity from about 40 to about 60 mP and a pH from about 4.5 to about 6.5. In yet another preferred embodiment where the gelatine composition is used in the manufacture of soft shell capsule pharmaceutical products, the gelatine will have a bloom strength from about 125 to about 200, a viscosity from about 25 to about 45 mP and a pH from about 4.5 to about 6.5.

The gelatine composition of the invention will generally comprise from about 1% to about 20% by weight of the gelatine hydrolysate and from about 80% to about 99% by weight of the gelatine. In another embodiment, the gelatine composition will comprise from about 1% to about 5% by weight of the gelatine hydrolysate and from about 95% to about 99% by weight of the gelatine. In yet another embodiment, the gelatine composition will comprise from about 5% to about 10% by weight of the gelatine hydrolysate and from about 90% to about 95% by weight of the gelatine. In another embodiment, the gelatine composition will comprise from about 10% to about 15% by weight of the gelatine hydrolysate and from about 85% to about 90% by weight of the gelatine. In an additional embodiment, the gelatine composition will comprise from about 15% to about 20% by weight of the gelatine hydrolysate and from about 80% to about 85% by weight of the gelatine. In a typical embodiment, the gelatine composition will comprise a ratio of gelatine hydrolysate to gelatine from about 1:4 to about 1:99 (v/w).

In a preferred embodiment, the gelatine composition will comprise the gelatine hydrolysate of the present invention and a high molecular weight pharmaceutical grade gelatine. In one embodiment, the gelatine composition will comprise from about 5% to about 10% by weight of the gelatine hydrolysate and from about 90% to about 95% by weight of the pharmaceutical grade gelatine. In another embodiment, the gelatine composition will comprise from about 10% to about 15% by weight of the gelatine hydrolysate and from about 85% to about 90% by weight of the pharmaceutical grade gelatine. Advantageously, gelatine compositions of the invention and of this embodiment typically have reduced cross-linking as measured by the vortex hardening test and viscosity test. Gelatine compositions of this embodiment typically have a vortex hardening time of about 200 to about 300 seconds. In another embodiment, the vortex hardening time is greater than about 300 seconds. The procedure for determining the vortex hardening time is described in the Examples. Gelatine compositions of this embodiment typically also have an average initial viscosity of from about 10 to about 15 cP and after the addition of less than about 0.5% by weight of OB1207® (as defined in the examples) to the gelatine composition for about two hours at a reaction temperature of about 60° C., the gelatine composition has an average viscosity of from about 15 to about 50 cP. The procedure for measuring viscosity is described in the examples.

In one embodiment, glycine may be added to the gelatine composition of the invention. The glycine may be added to the gelatine composition at an amount of from about 0.5% to about 5% by weight. In a more typical embodiment, the amount of glycine will be from about 1.5% to about 2.5% by weight. In yet another embodiment, citric acid may be added to the gelatine composition. The citric acid may be added at an amount of from about 0.5% to about 5% by weight. In a more typical embodiment, citric acid is added to the gelatine composition in an amount of from about 0.5% to about 1.5%.

The gelatine composition of the invention may be employed in several applications including as a food ingredient, as a cosmetic ingredient and as a photographic ingredient. Because of the gelatine composition's improved cross-linking and dissolution properties, in a preferred embodiment, the gelatine composition is used in the manufacture of pharmaceutical products.

In one preferred embodiment, the gelatine composition is used in the manufacture of hard gelatine capsules. As detailed above, when the gelatine composition is used in the manufacture of hard capsule pharmaceutical products, the gelatine will have a bloom strength from about 200 to about 300, a viscosity from about 40 to about 60 mP and a pH from about 4.5 to about 6.5. A typical hard capsule formulation will comprise approximately 30% by weight of the gelatine composition of the invention, approximately 65% by weight water, approximately 5% by weight of a suitable dye, and will contain a pigment as needed. The hard gelatine capsules may be made according to any method generally known in the art.

In yet another preferred embodiment, the gelatine composition is used in the manufacture of soft capsule gelatine. As detailed above, when the gelatine composition is used in the manufacture of soft shell capsule pharmaceutical products, the gelatine will have a bloom strength from about 125 to about 200, a viscosity from about 25 to about 45 mP and a pH from about 4.5 to about 6.5. A typical soft capsule gelatine formulation will comprise from about 40% to about 45% by weight of the gelatine composition of the invention, from about 15% to about 35% by weight of plasticizer and from about 20% to about 45% by weight of water. The soft gelatine capsules may be made according to any method generally known in the art.

All publications, patents, patent applications and other references cited in this application are herein incorporated by reference in their entirety as if each individual publication, patent, patent application or other reference were specifically and individually indicated to be incorporated by reference.

Definitions

"Amino acid" is a basic building block of a protein.

"Amino acid sequence" is the amino acid order or sequence within a protein chain.

"Amphoteric" is a substance that can be both cationic and anionic in character, such as a protein.

"Bloom value" is the degree of firmness of a gel measured in grams. The bloom value is the force required for a punch of defined form and dimension to penetrate 4 mm deep into the surface of a 6.7% gelatine solution. The bloom values of commercially available gelatines are between 80 and 280.

"Bone chip" is chipped, degreased and dried bone from which, subsequent to demineralisation (see maceration), gelatine is produced.

"Cross-linking" refers to the mechanism by which a pellicle is formed on a pharmaceutical capsule. Typically, cross-linking decreases the dissolution properties of the capsule.

"Da" is an abbreviation for Dalton.

"EC" is an abbreviation for Enzyme Commission. It is typically used as a prefix in the numerical designation of an enzyme.

"Endopeptidase" is an enzyme typically belonging within subclass EC 3.4, peptide hydrolases, that hydrolyses nonterminal peptide linkages in oligopeptides or polypeptides and comprising any enzyme subclasses EC 3.4.21-99.

"Exopeptidase" is an enzyme of a group of peptide hydrolases within subclass EC 3.4 that catalyzes the hydrolysis of peptide bonds adjacent to the terminal amino or carboxyl group of an oligopeptide or polypeptide. The group typically encompasses enzyme subclasses 3.4.11-3.4.19.

"Food Grade Enzyme" is an enzyme that is typically free of genetically modified organisms and is safe when consumed by an organism, such as a human being. Typically, the enzyme and the product from which the enzyme may be derived are produced in accordance with applicable FDA guidelines.

"Hard capsules" are hollow capsules of various sizes made of pure gelatine with or without the addition of dye. They comprise an upper and lower part; these are joined together once filling is completed.

"Hydrolysate" is a reaction product obtained when a compound is cleaved through the effect of water. Protein hydrolysates occur subsequent to thermal, chemical or enzymatic degradation. During the reaction, large molecules are decomposed into soluble proteins, peptides and amino acids.

"4-Hydroxyproline" is an amino acid typically present only in collagenous protein.

"Instant gelatine" is powder gelatine capable of swelling in cold water.

"Microgel" is considered to be gelatine with a molecular weight greater than 300,000 Da.

"Ossein" is demineralised bone—gelatine raw material.

"Peptide" is defined as a compound formed of two or more amino acids, with an amino acid defined according to standard definitions, such as is found in the book "A Dictionary of Genetics" by King and Stansfield.

A "polypeptide" is a polymer made up of less than 350 amino acids.

"Protein" is defined as a molecule composed of one or more polypeptide chains; each composed of a linear chain of amino acids covalently linked by peptide bonds. Most proteins have a mass between 10 and 100 kilodaltons (kDa). A protein is often symbolized by its mass in kDa.

"Scleroproteins" are those proteins providing a support function within the body. They are insoluble in water and possess a fibrous structure. These proteins include e.g. keratin that occurs in hair and nails, the elastins and the collagens that occur in support and connective tissue, skin, bone and cartilage.

"Soft capsules" are elastic capsule made of gelatine for filling with active ingredient/excipient mixture. They can be produced with different wall thicknesses and either with or without a seam.

"Split" is a gelatine raw material; mid-layer of the connective tissue of cattle hide.

"Triple helix" is a basic structure of collagen consisting of 3 protein chains. These often possess somewhat different amino acid sequences.

"Type A gelatine" is acid digested gelatine.

"Type B gelatine" is alkali (basic) digested gelatine.

"Type LBSH" is a limed-bone hydrolysate of the present invention produced by proteolytic digestion of gelatine.

"Type LHSH" is a limed-hide hydrolysate of the present invention produced by proteolytic digestion of gelatine.

"Viscosity" is the internal resistance to flow exhibited by a fluid.

As various changes could be made in the above compounds, products and methods without departing from the scope of the invention, it is intended that all matter contained in the above description and in the examples given below, shall be interpreted as illustrative and not in a limiting sense.

EXAMPLES

The following examples illustrate the invention.

Example 1

The gelatine hydrolysate of the invention may be made according to the following process. A solution containing 34% gelatine was made by adding 1.94 kg of water to 1.0 kg of de-ionized processed gelatine. The gelatine was left to hydrate for 1 hour and then placed into a 55° C. water bath to dissolve. Once completely dissolved, the pH of the gelatine solution was adjusted to 6.0-6.5 with aqueous sodium hydroxide. Calcium Chloride was added to the gelatine solution in the amount of 0.037% w/w with the amount of gelatine in solution (CDG—Commercial Dry Gelatine, all additions in this procedure were based on this amount). An aliquot was taken and was diluted to 5% in order to test the Redox State of the solution. Peroxide testing strips (EM Science) were used to quickly measure the amount of peroxide. If peroxide was present, Fermcolase® 1000F (Genencor International Inc.) was added in 0.5 mL increments. After each addition, the solution was left to react for 30 minutes before repeating the peroxide measurement. Fermcolase® 1000F additions were repeated until the peroxide level approached zero.

Corolase® 7089 (AB Enzymes) was added to the solution in the amount of 0.1% v/w. Near the end of the 1-hour reaction time and before the addition of the next enzyme, a small sample was taken and the molecular weight was analyzed. This process was repeated for each of the enzyme additions. After a 1-hour reaction time, 0.05% w/w of Enzeco® Bromelain Concentrate (Enzyme Development Corp.) was added and the solution was left to react for an additional hour. Liquid Papain 6000L (Valley Research) was then added 0.1% v/w. After 1-hour, 0.05% w/w of Validase® FPII (Valley Research) was added to the solution and was reacted for another hour. The final enzyme addition was 0.1% v/w of Corolase® LAP (AB Enzymes). After 1-hour, the solution was heated to 90° C. to deactivate the remaining functional enzymes. In some instances, an additional 30-40 ppm of hydrogen peroxide was added to be certain the Papain 6000L was deactivated. However, no proof of enzymatic activity after heat deactivation was seen. A summary listing the details of the five enzymes used during hydrolysis is given in Table 1.

Example 2

The following procedure was used to quantify the degree of reduction in cross-linking for various gelatine compositions. In the control experiments, 10.0±0.1 g of gelatine was added to a 250 mL beaker, to which was added 90.0±0.5 g of de-ionized water. A watch glass was placed on the beaker and the gelatine was allowed to swell for 30-60 minutes. The swelled gelatine was placed into a 60±0.1° C. water bath for 15-30 minutes or until all of the gelatine was dissolved. A magnetic stir bar was placed into the gelatine solution and the pH was adjusted upon a stir plate with dilute NaOH and $H_2SO_4$ to a pH of 7.00±0.05 after which the magnetic stir bar was removed. The solution was placed into a water 40±0.1° C. water bath for 15-60 minutes to cool. A digital stirring motor (Heidolph Brinkman 2102) equipped with a 4-blade mixer was used to create vortex at 750±10 RPM. Immediately, 20±0.5 mL of a pH 7 phosphate buffered 10% formalin solution (Fisher Scientific) was added. The vortex hardening time was recorded (in seconds) as the time when the cross-linked gelatine solution collapsed upon the shaft of the 4-blade mixer. In experiments containing additives, a percentage of the gelatine was substituted with the desired additive (i.e., a 10% hydrolysate added sample contained 9.0 g of gelatine and 1.0 g of hydrolysate). The gelatines exhibiting a greater vortex hardening time are believed to have reduced tendencies towards formaldehyde-induced cross-linking.

As shown in Table 2, the vortex hardening test confirms the previous findings that the combination of glycine and citric acid can reduce the amount of gelatine cross-linking. More importantly, the addition of glycine alone has a dramatic effect on the vortex hardening time of this particular limed-bone gelatine sample. The addition of citrate did not reduce cross-linking. Curiously, the addition of 1.5% citrate promoted cross-linking in this particular sample. These results may serve to bolster the position of glycine's role as an aldehyde scavenger in this model system. The detrimental effects on cross-linking experienced by samples containing only citrate cannot be readily explained.

TABLE 2

| Sample | #of samples | Ave. Vortex Hardening (sec) | Rel. Std. Dev |
|---|---|---|---|
| High Bloom Limed-Bone Gelatine | 21 | 221.07 | 3.93% |
| 1.5% Glycine | 6 | 292.46 | 4.67% |
| 2.5% Glycine | 6 | 342.69 | 3.43% |

TABLE 1

| Name | Enzyme Type | Source | optimum ranges | Supplier |
|---|---|---|---|---|
| Corolase ® 7089 | Protease endopeptidase | Microbial bacillus subtilis | <60° C. pH 5-7.5 | AB Enzymes |
| Enzeco ® Bromelain Concentrate | Protease endopeptidase | Plant Pineapple | 50-60° C. @ pH 5.0 3.0-9.0 | Enzyme Development Corp. |
| Papain 6000 L | Protease hydrolase endopeptidase | Plant Papaya | 65-80° C. pH 5.0-7.0 | Valley Research |
| Validase ® FPII | Protease hydrolase exopeptidase | Microbial Fungal Aspergillus oryzae | 50-60° C. pH 5.0-8.0 | Valley Research |
| Corolase ® LAP | Protease Pure exopeptidase | Microbial Aspergillus sojae | <70° C. pH 6.0-9.0 | AB Enzymes |

TABLE 2-continued

| Sample | #of samples | Ave. Vortex Hardening (sec) | Rel. Std. Dev |
|---|---|---|---|
| 0.5% Citrate | 6 | 218.11 | 4.21% |
| 1.5% Citrate | 6 | 177.88 | 3.97% |
| 2.5% Glycine & 0.5% Citrate | 6 | 346.33 | 9.63% |

FIG. 1 details the effects of adding hydrolysate Type LHSH, a limed-hide hydrolysate of the present invention (MW~1200 Da), and a Type BH-3 hydrolysate (MW~2200 Da) to LH-1, a typical limed-hide gelatine with bloom of 260 g and a 6.67% viscosity of 45 mP. The results show an increase in the vortex hardening time for both added hydrolysates. However, the performance was better upon the addition of the hydrolysate of the present invention, Type LHSH. Several hide gelatines exhibited this very rapid cross-linking that was previously only seen in limed-bone gelatines with a 6.67% viscosity near 60 mP.

Table 3 shows the vortex hardening time of several limed-hide gelatines in relation to different properties of molecular weight. No conclusive trends could be deduced with the exceptions of a possible correlation of an increased percentage of microgel and viscosity with increased cross-linking and a subsequent reduction in the vortex hardening time.

TABLE 3

| Sample | Vortex Hardening (sec) | Bloom/vis (mP) | MW (Da) | MN (Da) | MZ (Da) | MZ + 1 (Da) | Polydispersity | % Microgel |
|---|---|---|---|---|---|---|---|---|
| LH-1 | 8.30 | 260/45 | 213,904 | 52,949 | 600,249 | 851,367 | 4.0398 | 17.41 |
| LH-2 | 8.70 | 229/44 | 225,257 | 50,655 | 629,993 | 880,268 | 4.446 | 18.76 |
| LH-3 | 8.99 | 264/48 | 225,013 | 61,969 | 592,328 | 847,234 | 3.6311 | 18.80 |
| LH-4 | 9.33 | 240/33 | 206,317 | 46,151 | 620,740 | 887,725 | 4.4705 | 16.46 |
| LH-5 | 10.85 | 260/52 | 232,321 | 63,612 | 600,657 | 852,871 | 3.6522 | 18.58 |
| LH-6 | 34.18 | 247/48 | 232,608 | 63,148 | 599,777 | 852,031 | 3.6836 | 17.73 |
| LH-7 | 47.31 | 263/42 | 232,384 | 55,568 | 635,932 | 888,496 | 4.1827 | 20.00 |
| LH-8 | 55.49 | 276/46 | 247,005 | 60,234 | 653,816 | 897,853 | 4.1157 | 22.51 |
| LH-9 | 186.51 | 151/40 | 184,474 | 45,503 | 526,119 | 780,369 | 4.0541 | 12.76 |
| LH-10 | 208.14 | 239/36 | 202,601 | 49,094 | 579,370 | 826,045 | 4.1268 | 16.28 |
| LH-11 | 315.30 | 222/32 | 175,773 | 45,076 | 520,956 | 779,246 | 3.8232 | 12.363 |

Table 4 shows the results of adding 10% of hydrolysate Type LBSH, a limed-bone hydrolysate of the present invention, hydrolysate Type BB-4, and glycine to a high viscosity limed-bone gelatine with a bloom of 240 g and 6.67% viscosity of 64 mP. This high viscosity extract exhibits similar cross-linking properties as some limed-hide gelatines with much lower viscosity. This gelatine showed a significant reduction in cross-linking in the presence of all three additives. However, the Type LBSH hydrolysate increased the vortex hardening time by nearly 30% in comparison to the Type BB-4. Glycine showed the greatest reduction in cross-linking and subsequent increase in the vortex hardening time.

TABLE 4

| Sample | Ave. Vortex Hardening (sec) | Relative Std. Dev. |
|---|---|---|
| High Viscosity Limed-Bone Control | 28.8 | 40.1% |
| Control w/ 10% Type LBSH | 242.6 | 5.1% |
| Control w/ 10% Type BB-A | 187.7 | 5.1% |
| Control w/ 10% Glycine | >480 | N/A |

Table 5 shows the results of an experiment trying to determine the amount of low molecular weight hydrolysate needed to match the performance of glycine when added to a medium viscosity limed-bone pharmaceutical gelatine (Bloom=244, 6.67% vis.=47.0 mP) as measured by the vortex hardening test. The results indicate that 4-5% of Type LBSH is needed to match the performance of 2.5% glycine, while 5-6% Type BB-4 is needed. Similarly, 10% Type LBSH and 11-12% Type BB-4 is needed to match the reduction in cross-linking achieved by 5.0% glycine.

TABLE 5

| Sample | Ave. Vortex Hardening (sec) | Rel. Std. Dev. |
|---|---|---|
| Medium Viscosit Limed-Bone Control | 192.5 | 11.1% |
| w/ 2.5% Glycine | 307.8 | 3.1% |
| w/ 5.0% Glycine | 506.5 | 3.9% |
| w/ 4.0% Type LBSH | 281.5 | 2.1% |
| w/ 5% Type LBSH | 356.7 | 2.7% |
| w/ 7.5% Type LBSH | 395.9 | 3.7% |
| w/ 10% Type LBSH | 492.2 | 4.0% |
| w/ 5% Type BB-4 | 295.8 | 3.1% |
| w/ 6% Type BB-4 | 323.7 | 0.4% |
| w/ 7.5% Type BB-4 | 339.6 | 0.2% |

TABLE 5-continued

| Sample | Ave. Vortex Hardening (sec) | Rel. Std. Dev. |
|---|---|---|
| w/ 10.0% Type BB-4 | 434.0 | 2.4% |
| w/ 11.0% Type BB-4 | 483.6 | 3.6% |
| w/ 12.0% Type BB-4 | 519.9 | 3.7% |

Example 3

The gelatine hardening agent OB1207® [2-(4-Dimethyl-carbamoyl-pyridino)-ethane-1-sulfonate] was acquired from H.W. Sands Corporation. OB1207® has been touted as a replacement for formaldehyde in photographic emulsions. Reaction 1 describes the cross-linking of OB1207® with gelatine. The formation of amide and ester bonds between gelatine chains through the reaction with OB1207® may closely mimic the type of cross-linking seen in gelatine samples that have been aged and/or stressed due to exposure to extremes of heat and humidity.

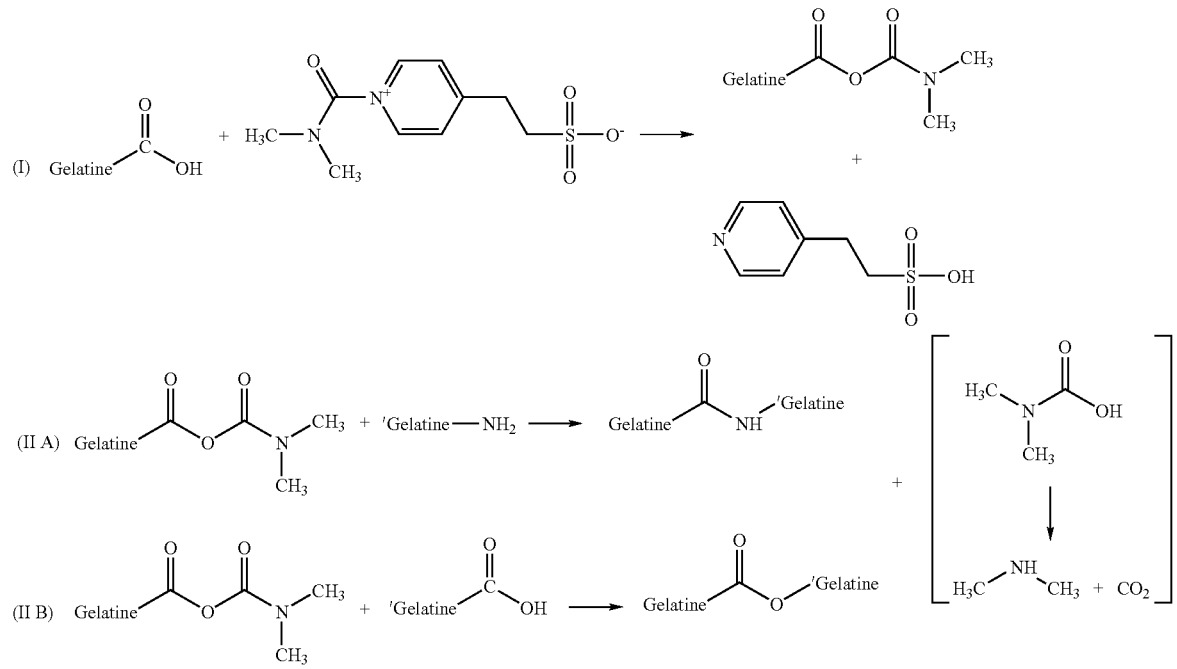

Reaction 1

In control experiments, 15.0±0.1 g of gelatine was added into a 250 mL flask. To this, 95.0±0.5 g of de-ionized water and a magnetic stir bar was added. The gelatine was covered with parafilm allowed to swell for 30-60 minutes. The flask was placed into a 60±1.0° C. water bath for 15-20 minutes or until all of the gelatine was dissolved. The viscosity of this solution was measured using a Brookfield DV-III+Rheometer at 50 RPM and 60.0±0.1° C. A solution made of 0.30 g of OB1207® dissolved in 10.0 g of de-ionized water was slowly added to the remaining gelatine in the flask while stirring on a stir plate. The flask was placed back into the water bath. The viscosity of the solution was measured 2 hours later. In experiments containing the addition of hydrolysates, a percentage of the control gelatine was substituted with the desired hydrolysate (i.e., a 10% hydrolysate added sample contained 13.5 g of gelatine and 1.5 g of hydrolysate).

The results of viscosity experiments involving a medium bloom and viscosity gelatine (LB-1) after cross-linking with OB1207® are given in Table 6. Control A LB-1 had no hydrolysate or BO1207® added, whereas control B LB-1 had no hydrolysate, but was cross-linked with OB1207®. After two hours, Control B was too viscous to read on the Brookfield rheometer indicating a very high degree of cross-linking. The samples spiked with hydrolysates showed a decreased degree of cross-linking, with the best results achieved with Type LBSH, the hydrolysate of the present invention, especially at the 10%-spiked level.

TABLE 6

| Sample | Ave. Initial Vis. (cP) | Ave. Final Vis. (cP) |
| --- | --- | --- |
| Control A LB-1 | 16.2 | 16.5 |
| Control B LB-1 (no additive) | 15.9 | 73.5 |
| w/ 5% Type LBSH | 13.2 | 48.6 |

TABLE 6-continued

| Sample | Ave. Initial Vis. (cP) | Ave. Final Vis. (cP) |
| --- | --- | --- |
| w/ 5% Type BB-4 | 13.2 | 53.2 |
| w/ 5% Type BB-1a | 14.4 | 69.0 |
| w/ 5% Type BB-1b | 13.2 | 62.4 |
| w/ 10% Type LBSH | 12 | 31.2 |
| w/ 10% Type BB-4 | 11.2 | 39.8 |
| w/ 10% Type BB-1a | 12.6 | 57.4 |
| w/ 10% Type BB-1b | 12 | 46.8 |

Example 4

The following procedure was used to determine the content of primary amines in the gelatine hydrolysate. The use of trinitrobenzenesulfonic acid (TNBS) to measure the amount of primary amines was described by Alder-Nissen (6). A modified version of this procedure was used to measure the relative amounts of primary amines in gelatine hydrolysates. Reaction 2 depicts the derivitization of a primary amine with TNBS.

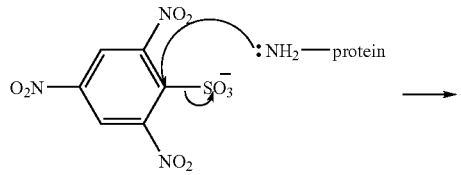

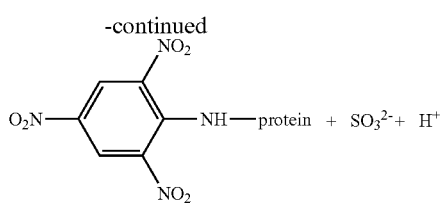

Reaction 2

Glycine (Acros) in the amount of 2.000±0.002 g was added to a 250 mL beaker and brought up to a weight of 200.00±0.01 g using a 1% sodium dodecyl sulfate ("SDS", Aldrich) solution (glycine solution now referred to as G-1). Gelatine hydrolysates in the amount of 4.000±0.002 g were added to 250 mL beakers and brought up to a weight of 100±0.01 g using the 1% SDS solution (hydrolysate solution now referred to as H-1). The beakers containing the G-1 and H-1 solutions were placed on a hotplate and heated to a temperature of 80-85° C. to fully dissolve and disperse the solids. The solutions were cooled to room temperature and then 1.00 g of G-1 was added to a 250 mL beaker and brought up to a weight of 200.00±0.01 g using the 1% SDS solution (G-2). Dilutions of G-2 were made in 50 mL volumetric flasks by adding 50, 37.5, 25, 12.5, 5, and 0.5 mL of G-2, respectively. The flasks were brought up to the mark by using the 1% SDS solution. The solution H-1 was diluted to create H-2 by adding 1.00 g of H-1 and bringing it up to a weight of 200.00±0.01 g in a 250 mL beaker using the 1% SDS solution. Into a 15 mL test tube was added 2 mL of a 0.2125 M phosphate buffer (made by adding of 0.2125 M $NaH_2PO_4$ to 0.2125 M $Na_2HPO_4$ until a pH of 8.20±0.02 is reached), and 250 μL of the G-3 standards. This corresponds to a 6-standard glycine calibration containing 0.1667, 0.1250, 0.0833, 0.0417, 0.0167, and 0.0017 μmoles of primary amines per sample, respectively. Similarly, 250 μL of each H-2 solution was added to a 15 mL test tube (corresponding to 50 μg of sample) along with 2 mL of the phosphate buffer. A control sample is made by adding 250 μL of the 1% SDS solution into a 15 mL test tube with 2 mL of buffer. A 0.1% trinitrobenzene solution was made by adding 170±2 μL of a 1 M TNBS solution (Sigma) into a 50 mL volumetric flask and brought up to the mark with de-ionized water and immediately covered with aluminum foil as TNBS is light sensitive.

The following steps were all conducted in a photographic dark room. To the test tubes, 2 mL of the 1% TNBS solution was added. The test tubes were then vortexed (Fisher Scientific Vortex Genie 2) for 5 seconds. The samples were then placed into a 50.0±0.1° C. water bath for 30 minutes. The samples were then vortexed for an additional 5 seconds and placed back into the water bath for 30 minutes. The samples were removed from the water bath and 4 mL of 0.100 N HCl solution was added to terminate the TNBS reaction. The solutions were vortexed for 5 seconds and allowed to cool for 10 minutes (longer cooling may lead to turbidity because of the SDS). The absorbance of the each sample was read at 340 nm (Beckman DU-7 Spectrophotometer) against a water blank. The amounts of primary amines in the samples were calculated by using an absorbance-based linear regression calculation of the glycine standards.

Derivatization of primary amines with o-phthaldialdehyde (OPA) to measure proteolysis in milk proteins was described by Church et al (7). Nielsen et al (8) used OPA to measure the degree of hydrolysis in other food proteins, including that of gelatine. An advantage of the Nielsen method is the substitution of the more environmentally friendly dithiothreitol (DTT—Cleland's Reagent) for β-mercaptoethanol as the sulfur-containing reducing agent. This procedure is adapted from the work of Neilson et al. Reaction 3 depicts the reaction of primary amines with OPA in the presence of DTT.

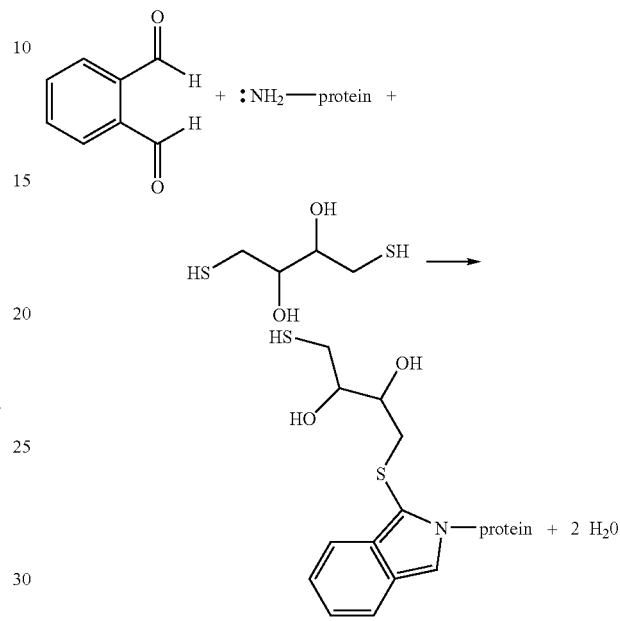

Reaction 3

The OPA reagent was prepared by adding 7.620 g of Sodium tetraborate decahydrate (Fisher Scientific) and 200 mg SDS to a 200 mL volumetric flask. Deionized water in the amount of approximately 150 mL was added to and the solution was stirred until completely dissolved. OPA (Aldrich) in the amount of 160 mg was dissolved in 4 mL of ethanol (Fisher Scientific) and quantitatively transferred to the volumetric flask using deionized water. DTT (Aldrich) in the amount of 176 mg was added and the entire solution was brought up to volume with deionized water. Glycine standards were created by adding 50 mg of glycine to a 500 mL volumetric flask and filling to the mark with deionized water. Dilutions were made by adding 100, 75, 50, 25, and 5 mL of the glycine solution to 100 mL volumetric flasks and filling to the mark with deionized water creating 5 glycine standards. Gelatine hydrolysate samples were prepared by adding 0.500 g of hydrolysate to a 100 mL volumetric flask and adding deionized water to the mark. To another 100 mL volumetric flask, 10 mL of the hydrolysate solution was added and filled to the mark with deionized water. To a 15 mL test tube, 3.0 mL of the OPA reagent solution was added followed by 400 μL of either a glycine standard (resulting in 40, 30, 20, 10 and 2 μg of glycine) or gelatine sample (200 μg of hydrolysate). A control sample using 400 μL of water was also used to measure the absorbance of OPA alone. The sample was vortexed for 5 seconds. Asbsorbance was read exactly 2 minutes after the addition of sample against a water blank. Deviation from the 2-minute requirement significantly impacts absorbance. Each sample or standard was then tested in two minute intervals. The amounts of primary amines in the samples were calculated by using an absorbance-based linear regression calculation of the glycine standards.

Table 7 and Table 8 show the results of TNBS and OPA derivatization of primary amines in 6 gelatine hydrolysates, a first-extract gelatine, a glycine trimer, and a lysine monomer. The degree of hydrolysis is reported as the amount of primary amines divided by the number of primary amines in the HCl hydrolyzed sample (6N HCl for 24 hours @ 110° C.). The TNBS and OPA derived molecular weights are the inverse of the amount of primary amines per sample amount. The TNBS and OPA derived molecular weights are considered only to be qualitative, the real significance being the measured amount of primary amines in each of the samples. The primary amine derived molecular weights do not take into account the double derivatization of lysine and hydroxylysine, nor does it take into account the fact that secondary amines are not derivatized by either derivatizing agent. However, when assuming these factors are relatively constant for all gelatine hydrolysates, the primary amine derived molecular weight is a useful means of comparing the relative degrees of hydrolysis of amongst different types of gelatine hydrolysates. Type LBSH and Type LHSH, limed-bone and limed-hide hydrolysates according to the present invention, showed an average increase of nearly 30-130% in primary amines over other enzymatically digested hydrolysates. The average molecular weight as measured by SEC/HPLC methodology is also given. Note that the molecular weights for lysine and the glycine trimer are far from the known molecular weight values. The TNBS and OPA derived molecular weights are also very similar to the expected results of the HCl hydrolyzed gelatine sample, where as the HPLC/SEC data is almost 5 times this amount. This demonstrates the relative inaccuracy of low molecular weight SEC/HPLC methodology generally used to measure the molecular weight of gelatine hydrolysates. TNBS and OPA derived molecular weights are not considered for gelatine. The complexities of the gelatine macromolecule inhibit an accurate depiction of molecular weight using this simplified model. The OPA derivatization proves to be a much more reliable means for measuring primary amine content in comparison to derivatization with TNBS.

TABLE 7

| Sample | Ave. uMol Primary amines/ug sample | | Relative Std. Dev. | | Degree of Hydrolysis | | Ave. Derived Molecular Weight (Da) | | |
|---|---|---|---|---|---|---|---|---|---|
| | TNBS | OPA | TNBS | OPA | TNBS | OPA | TNBS | OPA | SEC |
| Type LBSH | 1.05E-03 | 1.10E-03 | 11.7% | 2.8% | 14.1% | 14.5% | 952 | 911 | ~1800 |
| Type LHSH | 1.02E-03 | 1.07E-03 | 13.7% | 1.3% | 13.7% | 14.1% | 980 | 936 | |
| Type BB-4 | 7.52E-04 | 8.56E-04 | 18.6% | 2.6% | 10.1% | 11.3% | 1330 | 1169 | ~1900 |
| Type BB-1a | 4.53E-04 | 4.91E-04 | 46.8% | 2.4% | 6.1% | 6.5% | 2209 | 2035 | ~3000 |
| Type BB-1b | 5.26E-04 | 5.54E-04 | 30.8% | 2.0% | 7.1% | 7.3% | 1902 | 1805 | ~3500 |
| Gelatine | 2.31E-04 | 3.39E-04 | 2.3% | 1.0% | 3.1% | 4.5% | | | |
| HCl Hydrolysate | 7.43E-03 | 7.57E-03 | 5.3% | 0.7% | 100.0% | 100.0% | 135 | 132 | ~750 |
| Gly-Gly-Gly | 3.66E-03 | 4.98E-03 | 13.3% | 0.7% | | | 273 | 201 | ~800 |
| Lysine | 6.43E-03 | 5.85E-03 | 10.1% | 0.7% | | | 156 | 171 | ~900 |

TABLE 8

| Sample | Ratio of Primary Amines Compared to HCl Hydrolysate | | Ratio of Primary Amines Compared to Type LBSH | | Ratio of Primary Amines Compared to Gelatine | |
|---|---|---|---|---|---|---|
| | TNBS | OPA | TNBS | OPA | TNBS | OPA |
| Type LBSH | 0.14 | 0.14 | 1.00 | 1.00 | 4.56 | 3.24 |
| Type LHSH | 0.14 | 0.14 | 0.97 | 0.97 | 4.43 | 3.15 |
| Type BB-4 | 0.10 | 0.11 | 0.72 | 0.78 | 3.26 | 2.52 |
| Type BB-1a | 0.06 | 0.06 | 0.43 | 0.45 | 1.96 | 1.45 |
| Type BB-1b | 0.07 | 0.07 | 0.50 | 0.50 | 2.28 | 1.63 |
| Gelatine | 0.03 | 0.04 | 0.22 | 0.31 | 1.00 | 1.00 |
| HCl Hydrolysate | 1.00 | 1.00 | 7.08 | 6.90 | 32.24 | 22.34 |

REFERENCES

All references cited in the preceding text of the patent application or in the following reference list, to the extent that they provide exemplary, procedural, or other details supplementary to those set forth herein, are specifically incorporated by reference to the same extent as if each individual publication or patent application was specifically and individually indicated to be incorporated by reference.

1. Ofner, C. M., Zhang, Y., Jobeck, V., Bowman, B., "Crosslinking Studies in Gelatin Capsules Treated with Formaldehyde and in Capsules Exposed to Elevated Temperature and Humidity". *J. Pharm. Sci.*, January 2001, 90(1): 79-88.
2. Singh, S., Rama Rao, K. V., Venugopal, K. Manikandan, R., "Dissolution Characteristics: A Review of the Problem, Test Methods, and Solutions". *Pharmaceutical Technology*. April 2002; 36-58.
3. Adesunloye, T. A., Stach, P. E., "Effect of Glycine/Citric Acid on the Dissolution Stability of Hard Gelatin Capsules". *Drug Dev. Ind. Pharm.*, 1998, 24(6), 493-500.
4. Rama Rao, K. V., Pakhale, S. P., Singh, S., "A film Approach for the Stabilization of Gelatin Preparations Against Cross-Linking". *Pharmaceutical Technology*. April 2003: 54-63.
5. Fraenkel-Conrat, H., Olcott, H., "Reaction of Formaldehyde with Proteins. II. Participation of Guanidyl Groups and Evidence of Crosslinking". *J. Am. Chem. Soc.*, January 1946, 68(1): 34-37.

6. Adler-Nissen, J., "Determination of the Degree of Hydrolysis of Food Protein Hydrolysates by Trinitrobenzene Sulfonic Acid", *J. Agric. Food Chem.*, November-December 1979, 27(6): 1256-62.

7. Church, F., et al, "Spectrophotmetric Assay Using o-phthaldialdehyde for Determination of Proteolysis in Milk and Isolated Milk Proteins". *J. of Dairy Sci.*, 1983, 66(6): 1219-1227.

8. Nielsen, P. M., Petersen, D., Dambmann, C., "Improved Method for Determining Food Protein Degree of Hydrolysis". *J. of Food Sci.*, 2001, 66(5): 642-646.

9. Fraenkel-Conrat, H., Cooper, M., Olcott, H., "The Reaction of Formaldehyde with Proteins". *J. Am. Chem. Soc.*, June 1945, 67(6): 950-954.

10. Fraenkel-Conrat, H., Olcott, H., "The Reaction of Formaldehyde with Proteins V. Cross linking between Amino and Primary Amide or Guanidyl Groups". *J. Am. Chem. Soc.*, August 1948, 70(8): 2673-2684.

11. Ward, A. G., Courts, A., *The Science and Technology of Gelatin*. Academic Press Inc. 1977, pp. 231.

12. Davis, P., Tabor, B., "Kinetic Study of the Crosslinking of Gelatin by Formaldehyde and Glyoxal". *J. Polym. Sci. Part A.*, 1963, 1: 799-815.

13. Albert, K., Peters, B., Bayer, E., Treiber, U., Zwilling, M., "Crosslinking of Gelatin with Formaldehyde; a $^{13}$C NMR Study". *Z. Naturforsch.*, 1986, 41b: 351-358

14. Gold, T. B., et al., "Studies on the Influence of pH and Pancreatin on $^{13}$C-Formaldehyde-Induced Gelatin Cross-Links Using Nuclear Magnetic Resonance". *Pharm. Dev. Tech.*, 1996, 1(1): 21-26.

15. Matsuda, S., Iwata, H., Se, N., Ikada, Y., "Bioadhesion of Gelatin Films Crosslinked with Glutaraldehyde". *J Biomed Mater. Res.* April 1999; 45(1):20-7.

16. Jiskoot, W., et al., "Indentification of Formaldehyde-induced Modifications in Proteins: Reaction with Model Peptides". *J. Bio. Chem.*, February 2004, 279(8): 6235-6243.

17. Digenis, G. A., Gold, T. B., Shah, V. P., "Cross-Linking of Gelatin Capsules and its Relevance to Their in Vitro-in Vivo Performance". *J. Pharm. Sci.*, July 1994, 83(7):915-921.

18. Nagaraj, R. H., Shipanova, I. N., Faust, F. M., "Protein Cross-Linking by the Maillard Reaction". *J. Biol. Chem.*, August 1996, 271(32):19338-19345.

19. "Enzymic Hydrolysis of Food Proteins"; Elsvier Applied Science Publishers Ltd. (1986), page 122.

What is claimed is:

1. A gelatine composition comprising:
   a) a gelatine hydrolysate having an average primary amine content from about $1.0 \times 10^{-3}$ to about $1.0 \times 10^{-2}$ μmol of primary amine per μg of gelatine hydrolysate, wherein the gelatine hydrolysate is a proteolytic hydrolized gelatine; and
   b) gelatine, wherein the composition comprises from about 5% to about 10% by weight of the gelatine hydrolysate and from about 90% to about 95% by weight of the gelatine; and
   wherein the composition has an average viscosity of from about 10 to about 15 cP and after the addition of less than about 0.5% by weight of 2-(4-Dimethylcarbamoyl-pyridino)-ethane-1-sulfonate to the composition for about two hours at a reaction temperature of about 60° C., the composition has an average viscosity of from about 15 to about 50 cP.

2. The gelatine composition of claim 1, wherein the composition comprises a ratio of gelatine hydrolysate to gelatine from about 1:4 to about 1:99 (v/w).

3. The gelatine composition of claim 1, wherein the gelatine has an average molecular weight greater than about 150,000 Da.

4. The gelatine composition of claim 3, wherein the gelatine is pharmaceutical grade gelatine.

5. The gelatine composition of claim 4, wherein the gelatine is Type B gelatine.

6. The gelatine composition of claim 4, wherein the gelatine is Type A gelatine.

7. The gelatine composition of claim 1, further comprising adding glycine to the composition.

8. The gelatine composition of claim 7, wherein the amount of glycine added is from about 0.5% to about 5% by weight.

9. The gelatine composition of claim 7, further comprising adding citric acid to the composition.

10. The gelatine composition of claim 9, wherein the amount of citric acid added is from about 0.5% to about 5% by weight.

11. The gelatine composition of claim 9, wherein the amount of glycine added is from about 1.5% to about 2.5% by weight and the amount of citric acid added is from about 0.5% to about 1.5% by weight.

12. The gelatine composition of claim 1, wherein the composition has a vortex hardening time of from about 200 to about 300 seconds.

13. The gelatine composition of claim 1, wherein the composition has a vortex hardening time of greater than approximately 300 seconds.

\* \* \* \* \*